United States Patent [19]

Yuto et al.

[11] 4,398,582

[45] Aug. 16, 1983

[54] PNEUMATIC TIRE

[75] Inventors: Kazuaki Yuto, Higashimurayama; Toru Oniki, Higashikurume; Nobumasa Ikeda; Itsuo Miyake, both of Kodaira, all of Japan

[73] Assignee: Bridgestone Tire Company Limited, Tokyo, Japan

[21] Appl. No.: 260,552

[22] Filed: May 5, 1981

[30] Foreign Application Priority Data

May 23, 1980 [JP] Japan ................................. 55-67916

[51] Int. Cl.³ ........................ B60C 11/00; C08K 3/04
[52] U.S. Cl. ................................. 152/209 R; 106/307;
152/330 R; 152/374; 423/445; 423/456;
524/496; 524/526; 525/237
[58] Field of Search ............. 524/526, 496; 525/237;
152/209 R, 209 A, 209 B, 209 NT, 209 WT,
209 D, 330 R, 374, 354 R, 354 RB, 359, 360,
361 R; 156/128 T, 128.1, 128.6; 106/307;
423/445, 450, 455, 456

[56] References Cited

U.S. PATENT DOCUMENTS

| | | | |
|---|---|---|---|
| 3,304,281 | 2/1967 | Tucker | 524/526 |
| 3,491,052 | 1/1970 | Hare et al. | 524/526 |
| 3,596,697 | 8/1971 | Hansley et al. | 525/237 X |
| 3,736,312 | 5/1973 | Halasa | 526/174 |
| 4,259,218 | 3/1981 | Haws | 152/359 X |
| 4,360,627 | 11/1982 | Okado | 524/496 |

FOREIGN PATENT DOCUMENTS

| | | |
|---|---|---|
| 47-13532 | 4/1972 | Japan . |
| 47-42729 | 10/1972 | Japan . |
| 54-50545 | 4/1979 | Japan . |

OTHER PUBLICATIONS

Williams et al., The Temperature Dependence of Relaxation Mechanisms... Liquids, *Journal, American Chemical Society*, vol. 77, (1955), pp. 3701-3707.

Ferry, J. D., *Viscoelastic Properties of Polymers*, N.Y., J. Wiley & Sons, Inc., 1970, pp. 292-320.

Taft et al., "Diene Polymers and Copolymers... Rubbers", In: Whitby et al., *Synthetic Rubber*, (New York, Wiley & Sons, Inc., 1954), pp. 748-751.

Hansley et al., "Manufacture of Alfin Rubber-Molecular Weight Control", *Rubber Age*, vol. 94, No. 1, (Oct. 1963), pp. 87-92.

Yen-Chen-Yen, "Styrene-Butadiene Elastomer", In: *Stanford Research Institute Report No. 64*, (Menlo Park, Calif.), Nov. 1970, p. 165.

Grosch, K. A., "The Relation Between Friction and Visco-Elastic Properties of Rubber", In: *Proceedings of the Royal Society of London*, Series A, vol. 274, pp. 21-39, (Aug. 13, 1963).

*Primary Examiner*—William A. Powell
*Assistant Examiner*—Thomas Bokan
*Attorney, Agent, or Firm*—Sughrue, Mion, Zinn, Macpeak and Seas

[57] ABSTRACT

A pneumatic tire having remarkably low rolling resistance and high wet skid resistance without deteriorating the wear resistance is obtained by using in at least the ground-contact area of its tread, a rubber composition consisting essentially of 100 parts by weight of a mixed elastomer and 40–80 parts by weight of carbon black, the mixed elastomer consisting of 10–60 parts by weight of a solution-polymerized styrene-butadiene copolymer rubber having a bonded styrene content of 5–30% by weight and a trans-1,4 content in butadiene unit of not more than 45% by weight; 10–50 parts by weight of an emulsion-polymerized styrene-butadiene copolymer rubber having a bonded styrene content of 30–50% by weight; and 0–80 parts by weight of at least one rubber having a glass transition temperature of not higher than $-50°$ C., which is selected from the group consisting of natural rubber, synthetic polyisoprene rubber, polybutadiene rubber and an emulsion polymerized styrene-butadiene copolymer rubber having a bonded styrene content of 18–28% by weight. The use of carbon black having a specific surface area of 85–95 m²/g, a dibutyl phthalate absorption value of 100–110 ml/100 g, a tinting strength of 95–105 and a half value width of at least 180 mµ in the size distribution curve of the aggregates is particularly effective for lowering the rolling resistance.

3 Claims, 1 Drawing Figure

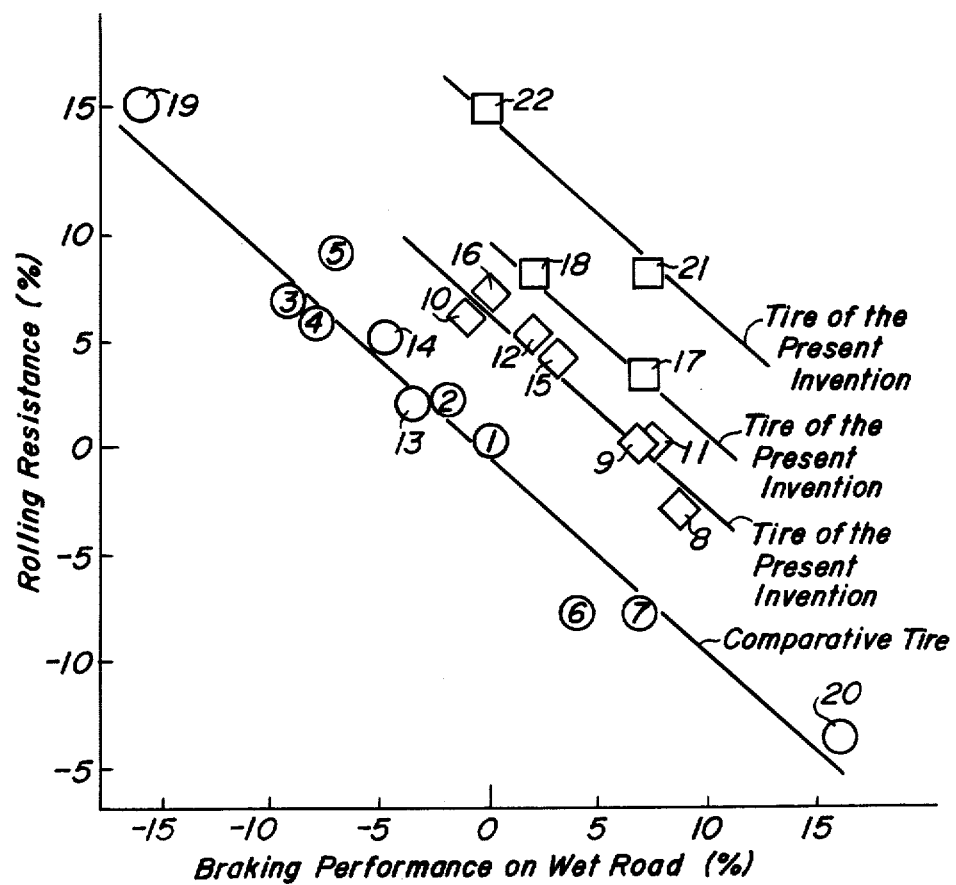

PNEUMATIC TIRE

BACKGROUND OF THE INVENTION

(1) Field of the Invention

The present invention relates to a pneumatic tire, particularly to a pneumatic tire having remarkably low rolling resistance and high wet skid resistance without deteriorating wear resistance and other properties.

(2) Description of the Prior Art

Recently, resource saving and energy saving have been socially demanded and investigations for developing automobiles with low gasoline consumption have been directed not only to the improvement of engine but also to the development of so-called low fuel consumption tires by which the power loss is reduced.

It has been generally known that if the rolling resistance of a tire is low, the gasoline consumption of an automobile is saved and the rolling resistance of a tire is greatly controlled by the quality, that is, kind and physical properties of the tread rubber. That is, if materials having low glass transition temperature Tg or low hysteresis loss are used, the rolling resistance can be reduced.

For example, it has been known that a blend of styrene-butadiene copolymer rubber (SBR) with natural rubber (NR) or polybutadiene rubber (BR), or a low styrene SBR is used instead of SBR generally broadly used as a tread rubber. However, these rubbers are extremely lower in the running stability, such as wet skid resistance and braking performance on wet road, and it has been very difficult to concurrently satisfy the rolling resistance and the running stability on wet road at once.

It has been know, as disclosed in Japanese Patent Application Publication No. 13,532/72 and No. 42,792/72, that a rubber composition produced by blending solution-polymerized SBR containing up to 30% by weight of bonded styrene with emulsion-polymerized SBR, BR, synthetic polyisoprene rubber (IR) or the like, and mixing the rubber blend with aromatic process oil, is used in the tire tread. However, the rubber compositions in both of the above described patent applications have improved workability and skid resistance on wet road, but the rubber compositions are still high in the rolling resistance, and are poor in the wear resistance and breaking strength, which are fundamental properties required to rubber for tire.

Recently, it has been known, as disclosed in Japanese Patent Laid Open Application No. 62,248/79, to improve the rolling resistance and running stability by using SBR having a glass transition temperature Tg of not lower than −50° C. and having a styrene content of 20–40% by weight and 1,2-bond content in the bonded butadiene of 50–80% by weight, but all the polymer consists of said SBR, so that satisfactory results have not always been obtained. Further, it has been known, as disclosed in Japanese Patent Laid Open Application No. 50,545/79, to use a rubber blend consisting mainly of a polymer having a Tg of not higher than −50° C. and containing a polymer having a Tg of not lower than the room temperature in the tire tread in order to attain the same objects as described above. However, it has been very difficult to satisfy concurrently the rolling resistance and running stability of a tire while keeping excellent breakage resistance and wear resistance of the tire.

Accordingly, it has never been yet attained to obtain a tire concurrently satisfying both the rolling resistance and running stability while maintaining excellent breakage and wear resistances.

It has been already known from "Proceedings of the Royal Society A274,21 (1963)" that the improvement of the friction coefficient on wet road can be attained by using a material having high hysteresis loss, which dissipates deformation energy of a rubber, because the tread surface contacting a road surface is subjected to deformation at high speed due to fine unevenness of the road surface and therefore the larger is the dissipation of energy due to mechanical loss, the larger the friction force is. But, such a material having the high hysteresis loss is high in the heat generation upon rolling the tire and therefore the rolling resistance is poor.

The inventors have diligently studied the above described drawbacks and noticed, as disclosed in the co-pending U.S. patent application Ser. No. 231,529, that the deformation at the friction surface of the tread occurs at high speed and the hysteresis loss in the deformation at high speed has a great influence on the friction force, that is, the running stability of the tire, while the deformation of the tread owing to ground contact, which has a great influence on the rolling resistance of the tire, corresponds to the rotation speed of the tire, so that the hysteresis loss at the deformation of less than 100 Hz has a great influence on the rolling resistance. According to temperature-time deducibility by Williams, Landel and Ferry, J. Am. Chem. Soc. 77:3701 (1955) it is supposed that the hysteresis at deformation at high speed controlling the running stability conforms to the hysteresis loss measured at a lower temperature than the temperature at which the tire is used, so that the inventors have studied the conditions under which the hysteresis loss is made to be larger in order to improve the running stability and found that such a hysteresis has a close relation to the hysteresis measured at about 0° C. in the dynamic measurement of 1.5 Hz and concerning the rolling resistance, the hysteresis loss has a close relation to one measured at 50°–70° C. Thus, if the hysteresis loss at about 0° C. is larger and the hysteresis loss at 50°–70° C. is smaller, rubber compositions wherein both the running stability and rolling resistance are concurrently improved, can be obtained.

SUMMARY OF THE INVENTION

The essential feature of the present invention lies in a pneumatic tire having a tread, at least the ground-contact area of which is formed of a rubber composition consisting essentially of 100 parts by weight of a mixed elastomer and 40–80 parts by weight of carbon black, said mixed elastomer consisting of 10–60 parts by weight of a solution-polymerized styrene-butadiene copolymer rubber having a bonded styrene content of 5–30% by weight and a trans-1,4 bond content in butadiene unit of not more than 45% by weight, 10–50 parts by weight of an emulsion-polymerized styrene-butadiene copolymer rubber having a bonded styrene content of 30–50% by weight, and 0–80 parts by weight of at least one rubber having a glass transition temperature Tg of not higher than −50° C., which is selected from the group consisting of natural rubber, synthetic polyisoprene rubber, polybutadiene rubber and an emulsion-polymerized styrene-butadiene copolymer rubber having a bonded styrene content of 18–28% by weight.

BRIEF DESCRIPTION OF THE DRAWING

The single FIGURE is a graph illustrating a relation between the braking performance on wet road of a tire and the rolling resistance thereof.

DESCRIPTION OF THE PREFERRED EMBODIMENT

In the present invention, there is used a solution-polymerized styrene-butadiene copolymer rubber having a bonded styrene content of 5–30% by weight, preferably 20–30% by weight, and a trans-1,4 bond content in butadiene unit of not more than 45% by weight in order to satisfy the rolling resistance. This styrene-butadiene copolymer rubber is produced by a commonly used method, that is, by a solution-polymerization method which uses a lithium base catalyst. The reason why the bonded styrene content is limited to 5–30% by weight and the trans-1,4 bond content in butadiene unit is limited to not more than 45% by weight is as follows. When the bonded styrene content is less than 5% by weight, a solution-polymerized styrene-butadiene copolymer rubber is not formed, but the resulting copolymer rubber is substantially a solution-polymerized polybutadiene rubber, and is very poor in the running stability. While, when the bonded styrene content exceeds 30% by weight or the trans-1,4 bond content in butadiene unit exceeds 45% by weight, the resulting rubber composition has a large hysteresis loss at 50°–70° C. and is very high in the rolling resistance. Further, 10–60 parts by weight of the copolymer rubber is contained in 100 parts by weight of the mixed elastomer. When the amount of the copolymer rubber is less than 10 parts by weight, the rolling resistance of the rubber composition can not be satisfactorily decreased, while when the amount of the copolymer rubber exceeds 60 parts by weight, the rubber composition is very poor in the breakage resistance and wear resistance.

In the present invention, in order to satisfy the running stability of tire, there is used an emulsion-polymerized styrene-butadiene copolymer rubber having a high bonded styrene content of 30–50% by weight. The reason why the bonded styrene content is limited to 30–50% by weight is as follows. When the bonded styrene content is less than 30% by weight, the running stability of the resulting rubber composition cannot be fully improved, while when the bonded styrene content exceeds 50% by weight, the low temperature brittleness of the resulting rubber composition is poor. The emulsion-polymerized styrene-butadiene copolymer rubber is used in an amount than 10–50 parts by weight of the rubber is contained in 100 parts by weight of the mixed elastomer. The use of less than 10 parts by weight of the rubber cannot fully improve the running stability of the resulting rubber composition, while the use of more than 50 parts by weight of the rubber deteriorates the low temperature brittleness and wear resistance of the resulting rubber composition.

Further, in the present invention, when the running stability and rolling resistance are concurrently satisfied, in order to maintain the breakage resistance, wear resistance and the like in a well-balanced state, which are properties demanded to the tire tread, a rubber having a glass transition temperature Tg of not higher than $-50°$ C., which is selected from the group consisting of natural rubber, synthetic polyisoprene rubber, polybutadiene rubber and an emulsion-polymerized styrene-butadiene copolymer rubber having a bonded styrene content of 18–28% by weight, may be contained in the mixed elastomer in addition to the above described solution-polymerized and emulsion-polymerized styrene-butadiene copolymer rubbers. The amount of the rubbers having a glass transition temperature Tg of not higher than $-50°$ C. must be up to 80 parts by weight, preferably 10–60 parts by weight in 100 parts by weight of the mixed elastomer.

In the present invention, 40–80 parts by weight, preferably 45–65 parts by weight, of carbon black is mixed with 100 parts by weight of the mixed elastomer. When the amount of the carbon black is less than 40 parts by weight, the resulting rubber composition is poor in the wear resistance and breakage resistance. While, when the amount exceeds 80 parts by weight, the resulting rubber composition is high in the heat build-up, and hence the rubber composition is high in the rolling resistance. Further, when there is used carbon black having a low heat build-up, which has a specific surface area ($N_2SA$) of 85–95 m²/g, preferably 85–92 m²/g, measured by the nitrogen adsorption method, a dibutyl phthalate absorption value (24M4 DBP) of 100–110 ml/100 g, preferably 103–110 ml/100 g, and a tinting strength (TINT) of 95–105, preferably 98–105, disclosed in the copending U.S. patent application Ser. No. 229,500, now U.S. Pat. No. 4,360,627 the resulting rubber composition has a very low rolling resistance without deteriorating the wear resistance and other properties. Among the above described carbon blacks having a low heat build-up, there can be particularly preferably used carbon black having a half value width ($\Delta D_{50}(St)$) of at least 180 m$\mu$ in the size distribution curve of the aggregates measured by the centrifugal sedimentation method.

In the present invention, so-called tread-base rubber consisting of a rubber composition, which has small values of tan $\delta$ (i.e., loss tangent) at both 0° C. and 60° C., may be arranged between the ground-contact area of tread and the reinforcing layer for tread in order to decrease the rolling resistance.

The pneumatic tires of the present invention may be any of pneumatic tires having a bias ply or radial ply reinforced with fibers of polyester, nylon, polyvinyl alcohol, aromatic polyamide, glass, metal and the like. However, pneumatic tires having a radial ply reinforced with the above described fibers are particularly suitable for attaining the object of the present invention.

The following examples are given for the purpose of illustration of this invention and are not intended as limitations thereof.

EXAMPLE 1

Various rubber compositions were produced according to the compounding recipe shown in the following Table 1. The rubber compositions were cured, and the hardness, elongation at break, breakage strength, 100% modulus and tan $\delta$ of the cured rubbers were measured. Further, tires having a size of 165 SR13 were produced by using the above obtained rubber composition in their tread, and the wear resistance, rolling resistance and braking performance on wet road of the tires were evaluated. The obtained results are shown in Table 1. The evaluation methods are as follows.

Hardness, elongation at break, breakage strength and 100% modulus:
  These properties were measured according to JIS K6301.

tan δ:
 The tan δ was measured by means of a mechanical spectrometer (dynamic shear strain amplitude: 0.5%) made by Rheometrics Corp.

Wear resistance:
 The wear resistance of a tire was measured by means of a Lambourn abrasion tester. The wear resistance of a sample tire was indicated by the value calculated according to the following formula.

$$\frac{\text{Worn amount of control tire} - \text{Worn amount of sample tire}}{\text{Worn amount of control tire}} \times 100$$

Rolling resistance:
 The rolling resistance of a tire was measured by a coast-down test at an initial speed of 120 km/hr under an internal pressure of 1.7 kg/cm$^2$ and a load of JIS 100% load. The rolling resistance of a sample tire was indicated by the value calculated according to the following formula.

$$\frac{\left(\begin{array}{c}\text{Rolling resistance of}\\ \text{control tire}\end{array}\right) - \left(\begin{array}{c}\text{Rolling resistance}\\ \text{of sample tire}\end{array}\right)}{\text{Rolling resistance of control tire}} \times 100$$

Braking performance on wet road:
 A tire was suddenly braked during the running at a speed of 80 km/hr on a wet concrete road covered with water in a depth of 3 mm, and the running distance of the tire after the tire was locked was measured. The braking performance on wet road of a tire was indicated by the value calculated according to the following formula.

$$\frac{\left(\begin{array}{c}\text{Running distance}\\ \text{of control tire}\end{array}\right) - \left(\begin{array}{c}\text{Running distance}\\ \text{of sample tire}\end{array}\right)}{\text{Running distance of control tire}} \times 100$$

Further, among the tires of the present invention shown in the following Table 1, tire Nos. 17 and 18 were produced by using, in their tread, carbon black having a specific surface area (N$_2$SA) of 90 m$^2$/g measured by the nitrogen adsorption method, a dibutyl phthalate absorption value (24M4 DBP) of 105 ml/100 g, a tinting strength (TINT) of 101 and a half value width (ΔD$_{50}$ (St)) of 190 mμ in the size distribution curce of the aggregates measured by the centrifugal sedimentation method. The production method of the carbon black is as follows.

As an apparatus for producing carbon black, use was made of an apparatus comprising a cylindrical air-mixing chamber, a cylindrical preliminary reaction chamber and a cylindrical final reaction chamber, which had diameters increasing stepwise and were coaxially connected with each other, said air-mixing chamber being provided with an injection nozzle for hydrocarbon feedstock in the axial direction, an inlet for primary air and a pair of inlets for secondary air, which were opposed to each other and inclined at an equal angle of 40° with respect to the axis of the above described injection nozzle, said preliminary reaction chamber being provided with two inlets for introducing a mixture of air and fuel or for introducing a hot gaseous reaction mixture formed by a previous combustion of the fuel and air necessary for generating sufficiently large amount of hot combustion gas for thermally decomposing the above described hydrocarbon feedstock into carbon black, and said final reaction chamber being provided at its end portion with a throttled portion, and further at the down stream of the throttled portion with a quenching zone having a spray nozzle for quenching water and a filtering means for separating the resulting carbon black and the off-gas from the suspended effluent.

Carbon black was produced under the following condition. Air preheated to 350° C. was introduced into the preliminary reaction chamber at a rate of 5,240 g/hr together with natural gas at a rate of 250 kg/hr through two inlets arranged on the chamber to form a hot combustion gas having a sufficiently high temperature for producing carbon black by the thermal decomposition of the hydrocarbon feedstock. Into the air-mixing chamber were introduced a hydrocarbon feedstock preheated to 250° C. at a rate of 1,000 l/hr under a pressure of 10 kg/cm$^2$ through an injection nozzle in the axial direction, primary air preheated to 350° C. at a rate of 300 kg/hr in the same direction as that of the hydrocarbon feedstock through an inlet for primary air, and further secondary air preheated to 350° C. at a rate of 1,040 kg/hr through a pair of inlets for secondary air, which were opposed to each other and inclined at an equal angle of 40° with respect to the axis of the injection nozzle. The hydrocarbon feedstock had a specific gravity (15°/4° C.) of 1.056, a BMCI (Bureau of Mines Correlation Index) of 136 and a CCR (Conradson Carbon Residue) of 9.5%.

Under the above described production condition, the preliminary reaction chamber was kept at a temperature of 1,650° C. and the final reaction chamber was kept at a temperature of 1,560° C. The carbon black produced by the thermal decomposition of the hydrocarbon feedstock under the above described condition was quenched to a temperature of not higher than 500° C. by spraying quenching water through a spray nozzle at a rate of 3,163 l/hr, which nozzle was located at the down stream of the throttled portion and was apart by 1.7 m from the position of the injection nozzle for hydrocarbon feedstock, and the resulting carbon black-containing suspension was passed through a conventional separating and recovering apparatus to obtain carbon black.

In the tires other than tire Nos. 17 and 18, commercially available N339 carbon black was used.

TABLE 1

| Polymer composition | | | | Tire No. | | | | | | | | | |
|---|---|---|---|---|---|---|---|---|---|---|---|---|---|
| | Butadiene unit | | | 1 | 2 | 3 | 4 | 5 | 6 | 7 | 8 | 9 | 10 |
| Styrene | trans (%) | cis (%) | vinyl (%) | Control | Comparative | Comparative | Comparative | Comparative | Comparative | Comparative | Present invention | Present invention | Present invention |
| Compounding recipe (%) | | | | | | | | | | | | | |
| Solution-polymerized SBR-A | 25 | 41 | 26 | 33 | | | | 60 | 60 | | 60 | 60 | 60 |

TABLE 1-continued

| | Styrene | Butadiene unit trans (%) | cis (%) | vinyl (%) | Tire No. 1 | 2 | 3 | 4 | 5 | 6 | 7 | 8 | 9 | 10 |
|---|---|---|---|---|---|---|---|---|---|---|---|---|---|---|
| Solution-polymerized SBR-B | 25 | 38 | 28 | 34 | | | | | | | | | | |
| Solution-polymerized SBR-C | 25 | 50 | 38 | 12 | | | | | | | 60 | | | |
| Emulsion-polymerized SBR-D | 35 | 64 | 16 | 20 | | | | | | | 40 | 40 | 40 | 40 | 40 |
| Emulsion-polymerized SBR-E | 23.5 | 66 | 15 | 19 | 100 | 100 | 100 | 40 | 40 | 60 | | | | |
| Polybutadiene rubber | — | 2.5 | 95 | 2.5 | | | | | | | | | | |
| Natural rubber | | | | | | | | | | | | | | |
| Carbon black* | | | | | 60 | 60 | 50 | 60 | 60 | 60 | 60 | 60 | 60 | 50 |
| Aromatic oil | | | | | 25 | 20 | 15 | 25 | 20 | 20 | 20 | 25 | 20 | 13 |
| Stearic acid | | | | | 1 | 1 | 1 | 1 | 1 | 1 | 1 | 1 | 1 | 1 |
| Zinc oxide | | | | | 3 | 3 | 3 | 3 | 3 | 3 | 3 | 3 | 3 | 3 |
| Dibenzothiazyl disulfide | | | | | 1.5 | 1.5 | 1.5 | 1.5 | 1.5 | 1.5 | 1.5 | 1.5 | 1.5 | 1.5 |
| N—Phenyl-N'—isopropyl-p-phenylenediamine | | | | | 1 | 1 | 1 | 1 | 1 | 1 | 1 | 1 | 1 | 1 |
| Sulfur | | | | | 1.75 | 1.75 | 1.75 | 1.75 | 1.75 | 1.75 | 1.75 | 1.75 | 1.75 | 1.75 |
| Results | | | | | | | | | | | | | | |
| Hardness (°) | | | | | 59 | 60 | 59 | 59 | 60 | 60 | 60 | 58 | 60 | 60 |
| Elongation at break (%) | | | | | 520 | 500 | 510 | 485 | 470 | 500 | 510 | 490 | 485 | 485 |
| Breakage strength (kg/cm$^2$) | | | | | 230 | 225 | 230 | 220 | 220 | 225 | 230 | 225 | 230 | 225 |
| 100% Modulus (kg/cm$^2$) | | | | | 20 | 22 | 21 | 19 | 21 | 22 | 22 | 20 | 22 | 21 |
| tan$\delta$ at 0° C. | | | | | 0.355 | 0.340 | 0.280 | 0.295 | 0.280 | 0.410 | 0.415 | 0.450 | 0.430 | 0.340 |
| tan$\delta$ at 60° C. | | | | | 0.240 | 0.230 | 0.190 | 0.195 | 0.180 | 0.305 | 0.310 | 0.260 | 0.250 | 0.185 |
| Lambourn abrasion (%) | | | | | — | +6 | −1 | −8 | −1 | ±0 | ±0 | −5 | −1 | +2 |
| Rolling resistance (%) | | | | | — | +2 | +7 | +6 | +9 | −8 | −8 | −3 | ±0 | +6 |
| Braking performance on wet road (%) | | | | | — | −2 | −9 | −8 | −7 | +4 | +7 | +9 | +7 | −1 |

| | Polymer composition | | | | Tire No. | | | | | | | | | |
|---|---|---|---|---|---|---|---|---|---|---|---|---|---|---|
| | | Butadiene unit | | | 11 Present invention | 12 Present invention | 13 Comparative | 14 Comparative | 15 Present invention | 16 Present invention | 17 Present invention | 18 Present invention | 19 Comparative | 20 Comparative |
| | Styrene | trans (%) | cis (%) | vinyl (%) | | | | | | | | | | |
| Compounding recipe (%) | | | | | | | | | | | | | | |
| Solution-polymerized SBR-A | 25 | 41 | 26 | 33 | | | | | 30 | 30 | 60 | 30 | 80 | 15 |
| Solution-polymerized SBR-B | 25 | 38 | 28 | 34 | 60 | 40 | | | | | | | | |
| Solution-polymerized SBR-C | 25 | 50 | 38 | 12 | | | 30 | 30 | | | | | | |
| Emulsion-polymerized SBR-D | 35 | 64 | 16 | 20 | 40 | 60 | | | 30 | 40 | 40 | 30 | 10 | 70 |
| Emulsion-polymerized SBR-E | 23.5 | 66 | 15 | 19 | | | 30 | 40 | | | | | | |
| Polybutadiene rubber | — | 2.5 | 95 | 2.5 | | | | 30 | | 30 | | | 10 | 15 |
| Natural rubber | | | | | | | 40 | | 40 | | | 40 | | |
| Carbon black* | | | | | 60 | 50 | 60 | 60 | 60 | 60 | 60 | 60 | 60 | 60 |
| Aromatic oil | | | | | 20 | 13 | 20 | 20 | 20 | 20 | 20 | 20 | 20 | 20 |
| Stearic acid | | | | | 1 | 1 | 1 | 1 | 1 | 1 | 1 | 1 | 1 | 1 |
| Zinc oxide | | | | | 3 | 3 | 3 | 3 | 3 | 3 | 3 | 3 | 3 | 3 |
| Dibenzothiazyl disulfide | | | | | 1.5 | 1.5 | 1.5 | 1.5 | 1.5 | 1.5 | 1.5 | 1.5 | 1.5 | 1.5 |
| N—Phenyl-N'—isopropyl-p-phenylenediamine | | | | | 1 | 1 | 1 | 1 | 1 | 1 | 1 | 1 | 1 | 1 |
| Sulfur | | | | | 1.75 | 1.75 | 1.75 | 1.75 | 1.75 | 1.75 | 1.75 | 1.75 | 1.75 | 1.75 |
| Results | | | | | | | | | | | | | | |
| Hardness (°) | | | | | 59 | 61 | 58 | 58 | 59 | 59 | 58 | 59 | 56 | 64 |
| Elongation at break (%) | | | | | 480 | 490 | 575 | 515 | 565 | 500 | 470 | 530 | 410 | 425 |
| Breakage strength (kg/cm$^2$) | | | | | 230 | 230 | 225 | 215 | 220 | 220 | 220 | 220 | 185 | 220 |
| 100% Modulus (kg/cm$^2$) | | | | | 21 | 22 | 19 | 20 | 20 | 21 | 23 | 22 | 17 | 26 |
| tan$\delta$ at 0° C. | | | | | 0.425 | 0.370 | 0.320 | 0.310 | 0.370 | 0.350 | 0.435 | 0.370 | 0.220 | 0.520 |
| tan$\delta$ at 60° C. | | | | | 0.240 | 0.195 | 0.220 | 0.195 | 0.200 | 0.175 | 0.210 | 0.170 | 0.105 | 0.370 |
| Lambourn abrasion (%) | | | | | ±0 | +3 | −1 | −2 | −2 | −1 | +3 | +2 | −15 | −17 |
| Rolling | | | | | | | | | | | | | | |

TABLE 1-continued

| | | | | | | | | | |
|---|---|---|---|---|---|---|---|---|---|
| resistance (%) | ±0 | +5 | +2 | +5 | +4 | +7 | +3 | +8 | +15 | −14 |
| Braking performance on wet road (%) | +7 | +2 | −3 | −5 | +3 | ±0 | +7 | +2 | −16 | +16 |

Note:
*Carbon black used in the tread of tire Nos. 17 and 18 is low heat build-up carbon black having a $N_2SA$ of 90 $m^2/g$, a 24M4 DBP of 105 ml/100 g, a TINT of 101 and a $\Delta D_{50}$ (St) of 190 mμ, and carbon black used in the tread of other tires is N339 carbon black.

It can be seen from Table 1 that tire Nos. 8–12, 15 and 16, which are tires according to the present invention, have excellent wear resistance and further have well-balanced satisfactory rolling resistance and braking performance on wet road. Particularly, when carbon black having a low heat build-up is used, the resulting tire is remarkably low in the rolling resistance as illustrated by tire Nos. 17 and 18.

EXAMPLE 2

Tires having a tread of cap/base structure and having a size of 165 SR13 were produced. Tires having a cap, which was formed of the rubber composition used in the tread of tire No. 9 or tire No. 10, and a base formed of a rubber composition having physical properties shown in the following Table 2 were referred to as tire No. 21 and tire No. 22, respectively. Properties of the tires were evaluated in the same method as described in Example 1. The obtained results are shown in the following Table 3.

TABLE 2

| | | |
|---|---|---|
| Hardness | | 61° |
| Elongation at break | | 450% |
| Breakage strength | | 240 kg/cm² |
| 100% Modulus | | 20 kg/cm² |
| tanδ | 0° C. | 0.18 |
| | 60° C. | 0.11 |

TABLE 3

| | Rolling resistance | Braking performance on wet road |
|---|---|---|
| Tire No. 21 | +8% | +7% |
| Tire No. 22 | +15% | ±0% |

It can be seen from Table 3 that a tire having a cap/base structure, wherein a rubber composition having small values of tan δ at both 0° C. and 60° C. is used as a base rubber, has a more decreased rolling resistance.

In order to illustrate more clearly, a relation between the rolling resistance and the braking performance on wet road of tire Nos. 1–22 is shown in the attached FIGURE. In the FIGURE, the ordinate shows the rolling resistance, and the abscissa shows the braking performance on wet road.

What is claimed is:

1. A pneumatic tire having a tread, at least the ground-contact area of which is formed of a rubber composition consisting essentially of 100 parts by weight of a mixed elastomer and 40–80 parts by weight of furnace carbon black,
   said mixed elastomer consisting of
   10–60 parts by weight of a solution-polymerized styrene-butadiene copolymer rubber having a bonded styrene content of 5–30% by weight and a trans-1,4 bond content in the butadiene unit of not more than 45% by weight,
   10–50 parts by weight of an emulsion-polymerized styrene-butadiene copolymer rubber having a bonded styrene content of 30–50% by weight, and
   0–80 parts by weight of at least one rubber having a glass transition temperature Tg of not higher than −50° C., which is selected from the group consisting of natural rubber, synthetic polyisoprene rubber, polybutadiene rubber and an emulsion-polymerized styrene-butadiene copolymer rubber having a bonded styrene content of 18–28% by weight; and
   said furnace carbon black having a specific surface area ($N_2SA$) of 85–95 $m^2/g$ measured by the nitrogen adsorption method, a dibutyl phthalate absorption value (24M4 DBP) of 100–110 ml/100 g, a tinting strength (TINT) of 95–105 and a half value width ($\Delta D_{50}$ (ST)) of at least 180 mμ in the size distribution curve of the aggregates.

2. A pneumatic tire according to claim 1, wherein the mixed elastomer contains 10–60 parts by weight of the rubber having a glass transition temperature Tg of not higher than −50° C.

3. A pneumatic tire according to claim 1, wherein the carbon black is furnace carbon black having a specific surface area ($N_2SA$) of 85–92 $m^2/g$ measured by the nitrogen adsorption method, a dibutyl phthalate absorption value (24M4 DBP) of 103–110 ml/100 g and a tinting strength (TINT) of 98–105.

* * * * *